United States Patent
Hudson

(10) Patent No.: US 9,124,707 B2
(45) Date of Patent: Sep. 1, 2015

(54) CONFERENCE MULTIPLEXING

(71) Applicant: International Business Machines Corporation, Armonk, NY (US)

(72) Inventor: Michael Hudson, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/949,367

(22) Filed: Jul. 24, 2013

(65) Prior Publication Data

US 2015/0030147 A1    Jan. 29, 2015

(51) Int. Cl.
    *H04M 3/56* (2006.01)

(52) U.S. Cl.
    CPC .................................... *H04M 3/568* (2013.01)

(58) Field of Classification Search
    None
    See application file for complete search history.

(56) References Cited

U.S. PATENT DOCUMENTS

| | | | |
|---|---|---|---|
| 4,215,247 A * | 7/1980 | Lambert | 708/670 |
| 6,134,223 A * | 10/2000 | Burke et al. | 370/265 |
| 6,683,858 B1 * | 1/2004 | Chu et al. | 370/263 |
| 2010/0020955 A1 * | 1/2010 | Wengrovitz | 379/202.01 |
| 2011/0307550 A1 | 12/2011 | Bastide et al. | |
| 2013/0266131 A1 * | 10/2013 | Williams | 379/202.01 |

OTHER PUBLICATIONS

IPCOM000208322D, Jul. 1, 2011, Mechanism to Facilitate a User Participating in Multiple Web Conferences with Audio\Video.

* cited by examiner

*Primary Examiner* — Harry S Hong
(74) *Attorney, Agent, or Firm* — Jordan IP Law, LLC

(57) ABSTRACT

Methods, products, apparatuses, and systems may provide at least multiplexed audio for a plurality of conferences. A conference attendee may simultaneously listen to the plurality of conferences via the multiplexed audio. Audio corresponding only to a respective conference of the plurality of conferences may be provided to another conference attendee having access to the respective conference. The multiplexed audio may be blocked from one or more other attendees. In addition, a conference operation may be implemented at any time to add a conference, delete a conference, select a subset of conferences, and/or rejoin conferences.

19 Claims, 4 Drawing Sheets

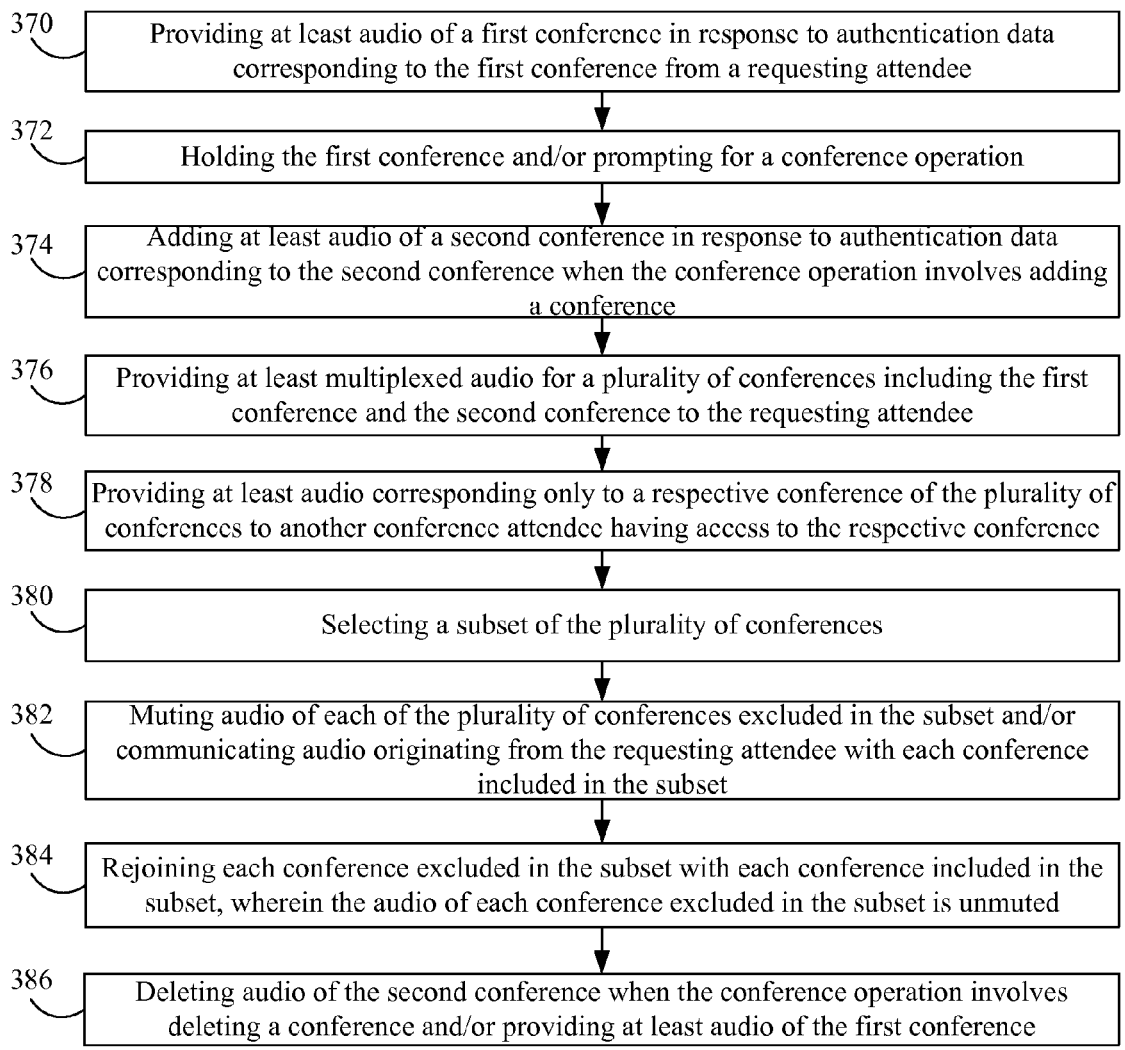
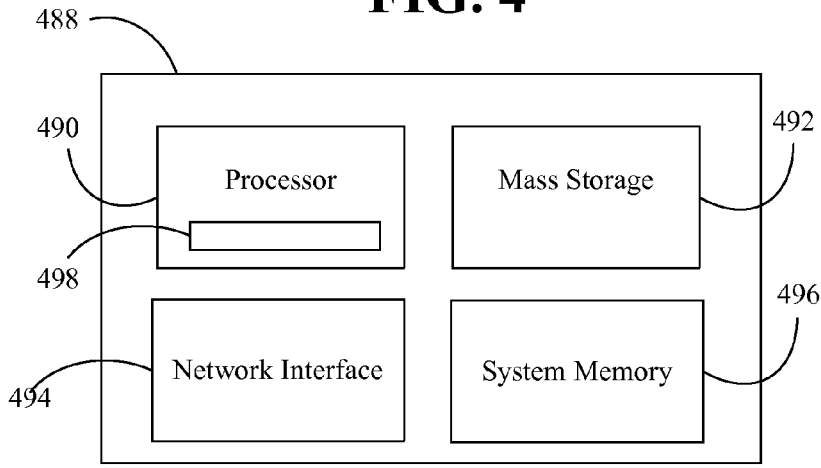

CONFERENCE MULTIPLEXING

BACKGROUND

Embodiments of the present invention generally relate conference multiplexing. More particularly, embodiments relate to providing multiplexed audio for a plurality of conferences, wherein the multiplexed audio may be provided to a requesting attendee having access to each of the plurality of conferences causing the requesting attendee to simultaneously listen to the plurality of conferences via the multiplexed audio, and wherein audio corresponding only to a respective conference of the plurality of conferences may be provided to another conference attendee having access to the respective conference.

A conference attendee may need to split an original conference into subgroups to listen to more than one conference, since each conference attendee may not have control to modify a conference (e.g., add a conference, delete a conference, etc.) as desired. Moreover, a conference attendee that is uninterested and/or unauthorized in a conference may be unnecessarily forced to participate, join, listen, and/or contribute in the conference when one or more other attendees wish to merge conferences. Accordingly, the conference attendee may experience inconvenience when accessing conferences.

BRIEF SUMMARY

Embodiments may include a method involving providing multiplexed audio for a plurality of conferences to a requesting attendee having access to each of the plurality of conferences to cause the requesting attendee to simultaneously listen to the plurality of conferences via the multiplexed audio. The method may include providing audio corresponding only to a respective conference of the plurality of conferences to another conference attendee having access to the respective conference.

Embodiments may include a method involving providing audio of a first conference in response to authentication data corresponding to the first conference from a requesting attendee. The method may include holding the first conference and prompting for a conference operation in response to a hold key code. In addition, the method may include adding audio of a second conference in response to authentication data corresponding to the second conference when the conference operation involves adding a conference. The method may also include providing multiplexed audio for a plurality of conferences including the first conference and the second conference in response to a release key code, wherein the multiplexed audio is provided to the requesting attendee having access to each of the plurality of conferences causing the requesting attendee to simultaneously listen to the plurality of conferences via the multiplexed audio, and wherein audio corresponding only to a respective conference of the plurality of conferences is provided to another conference attendee having access to the respective conference.

The method may include one or more of deleting audio of the second conference when the conference operation involves deleting a conference and providing audio of the first conference in response to the release key code. The method may include selecting a subset of the plurality of conferences in response to a selection key code and to identification data corresponding to each conference included in the subset. The method may also include one or more of muting audio of each conference excluded in the subset and communicating audio originating from the requesting attendee with each conference included in the subset. The method may include rejoining each conference excluded in the subset with each conference included in the subset in response to a rejoin key code, wherein the audio of each conference excluded in the subset is unmuted. The method may include blocking the multiplexed audio from one or more other conference attendees.

Embodiments may include a computer program product having a computer readable storage medium and computer usable code stored on the computer readable storage medium. If executed by a processor, the computer usable code may cause a computer to provide multiplexed audio for a plurality of conferences to a requesting attendee having access to each of the plurality of conferences to cause the requesting attendee to simultaneously listen to the plurality of conferences via the multiplexed audio, wherein audio corresponding only to a respective conference of the plurality of conferences is to be provided to another conference attendee having access to the respective conference.

Embodiments may include a computer program product having a computer readable storage medium and computer usable code stored on the computer readable storage medium. If executed by a processor, the computer usable code may cause a computer to provide audio of a first conference in response to authentication data corresponding to the first conference from a requesting attendee. The computer usable code, if executed, may also cause a computer to hold the first conference and prompt for a conference operation in response to a hold key code. The computer usable code, if executed, may also cause a computer to add audio of a second conference in response to authentication data corresponding to the second conference when the conference operation is to involve adding a conference. The computer usable code, if executed, may also cause a computer provide multiplexed audio for a plurality of conferences including the first conference and the second conference in response to a release key code, wherein the multiplexed audio is to be provided to the requesting attendee having access to each of the plurality of conferences to cause the requesting attendee to simultaneously listen to the plurality of conferences via the multiplexed audio, and wherein audio corresponding only to a respective conference of the plurality of conferences is to be provided to another conference attendee having access to the respective conference.

The computer usable code, if executed, may also cause a computer to one or more of delete audio of the second conference when the conference operation is to involve deleting a conference and provide audio of the first conference in response to the release key code. The computer usable code, if executed, may also cause a computer to select a subset of the plurality of conferences in response to a selection key code and to identification data corresponding to each conference to be included in the subset. The computer usable code, if executed, may also cause a computer to one or more of mute audio of each conference to be excluded in the subset and communicate audio originating from the requesting attendee with each conference to be included in the subset. The computer usable code, if executed, may also cause a computer to rejoin each conference excluded in the subset with each conference included in the subset in response to a rejoin key code, and wherein the audio of each conference excluded in the subset is to be unmuted. The computer usable code, if executed, may also cause a computer to block the multiplexed audio from one or more other conference attendees.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 3 is a flowchart of an example of a method to provide at least multiplexed audio for a plurality of conferences and/or to facilitate a conference operation according to an embodiment; and FIG. 4 is a block diagram of an example of a computing device according to an embodiment.

DETAILED DESCRIPTION

Figure 1A:
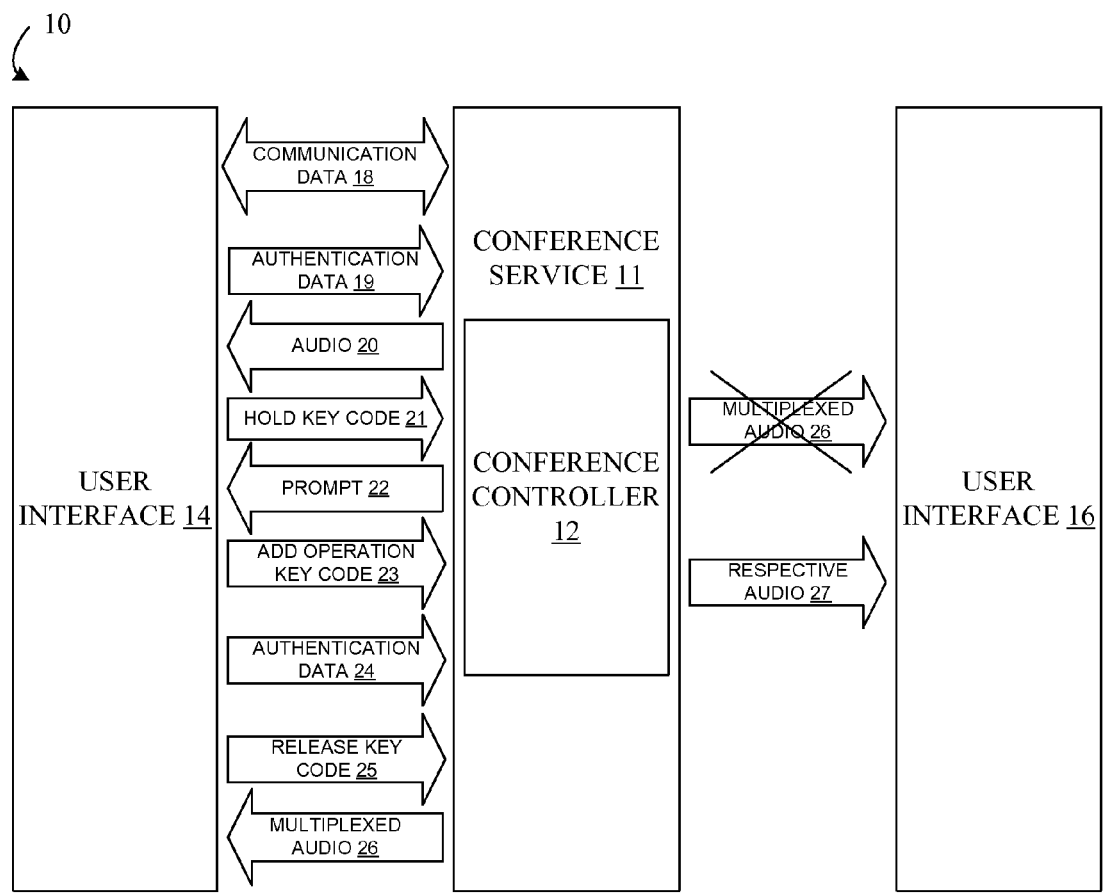
FIGS. 1A to 1C are block diagrams of examples of a scheme to provide at least multiplexed audio for a plurality of conference and/or to facilitate a conference operation according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It may be valuable to allow every conference attendee to simultaneously listen to a plurality of conferences which are of interest, to simultaneously listen to a plurality of conferences in which the attendee has access (e.g., is invited to join, has an access code to join, is authorized to join, etc.), and so on, or combinations thereof. In addition, it may be valuable to minimize a need to split an original conference into subgroups, since each conference attendee may have the control to modify a conference (e.g., add a conference, delete a conference, etc.) as desired. Moreover, it may be valuable to not unnecessarily force a conference attendee that is uninterested and/or unauthorized in a conference to participate, join, listen, and/or contribute in the conference when one or more other attendees wish to simultaneously listen to more than one conferences including the conference.

Figure 1B:
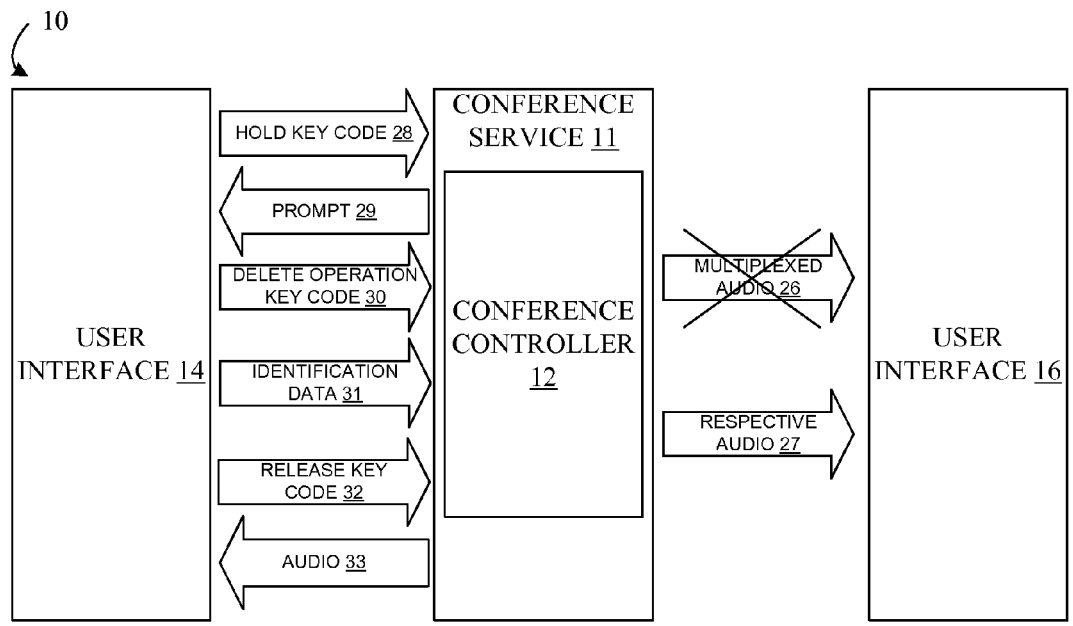
Figure 1C:
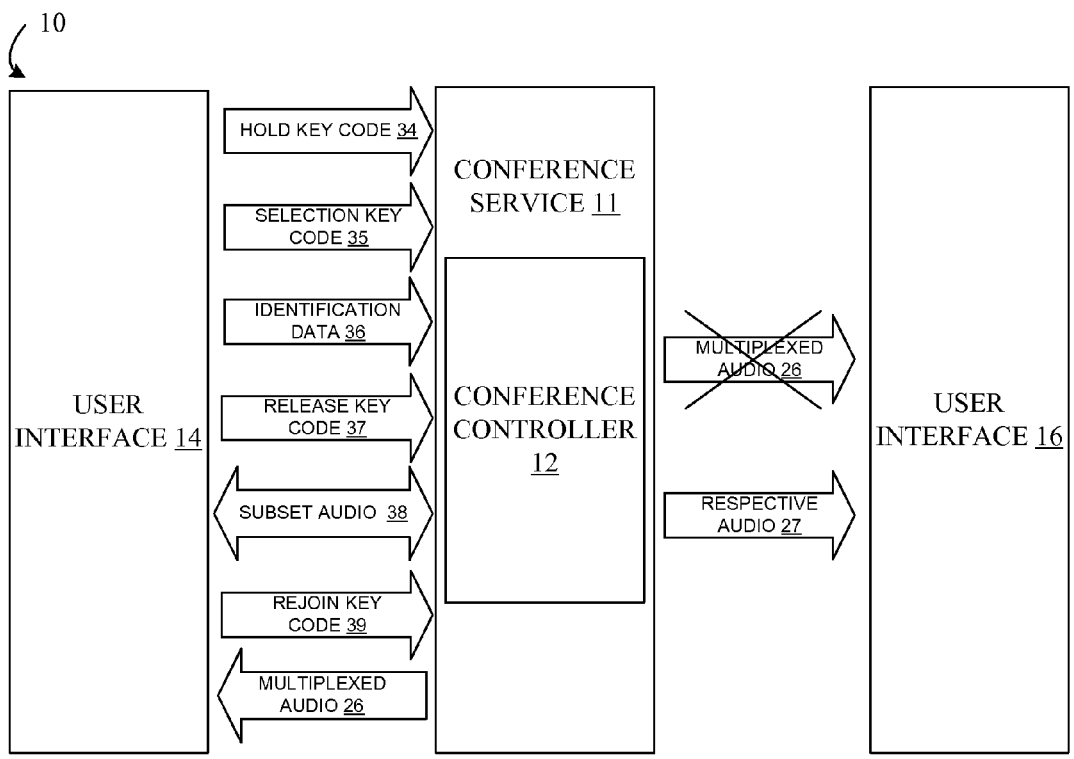

Referring now to FIGS. 1A to 1C, a scheme 10 is shown to provide at least multiplexed audio for a plurality of conferences and/or to facilitate a conference operation according to an embodiment. Each of the conferences may include a variety of functionality, such as audio functionality, video functionality, text functionality (e.g., Short Message Service), instant message (IM) text functionality, and so on, or combinations thereof. Each of the conferences may be hosted by a conference service 11, which may include any entity (e.g., any apparatus) operable to facilitate communication between two or more parties (e.g., attendees) participating in a conference. The conference service 11 may provide communication between the parties using any communication protocol. In one example, the conference service 11 may provide communication using H.323, Real Time Transfer Protocol (RTP), Session Initiation Protocol (SIP), Real Time Streaming Protocol (RTSP), Signaling System No. 7 (SS7, CCSS7, CCITT7, CCIS7, N7), and so on, or combinations thereof. Accordingly, the conference service 11 may host a teleconference, a video conference, a web conference, a voice over internet protocol (VoIP) conference, and so on, or combinations thereof.

In the illustrated example, the conference service 11 includes a conference controller 12, such as a server, an application, a plug-in (e.g., via an application programming interface (API)), and so on, or combinations thereof. It should be understood that the conference controller 12 may include a conference controller user interface (e.g., a command line interface, a graphical user interface (GUI), a hardwired keypad interface, etc.), which may be utilized to access one or more configurable settings to facilitate conference multiplexing. The settings may include options for a communication protocol (e.g., RTP, etc.), for a key code (e.g., hold key code, modification key code, release key code, modification key code, map key code, etc.), for authentication data (e.g., access codes, etc.), for a prompt (e.g., prompt for data, for key codes, etc.), for identification data (e.g., a sequence number, etc.), for an operation (e.g., hold, modification, release, etc.), for audio (e.g., multiplex audio, respective audio, mute, communicate, etc.), and so on, or combinations thereof.

Conference attendees may access one or more of the plurality of conferences via respective user interfaces. In the illustrated example, a conference attendee (e.g., requesting attendee) utilizes a user interface 14, and another conference attendee (e.g., other attendee) utilizes a user interface 16. The user interfaces 14, 16 may include any interface, such as a command line interface, a graphical user interface (GUI), a hardwired keypad interface, and so on, or combinations thereof. It should be understood that the user interfaces 14, 16 may include the same and/or similar functionality as the conference controller user interface, described above. The user interfaces 14, 16 may include, for example, a conference device such as a teleconferencing device (e.g., a public switched telephone network (PSTN) telephone), a VoIP device (e.g., a VoIP telephone), a SIP device (e.g., a SIP telephone), a personal computer (e.g., a tablet, a notebook, etc.), a mobile device (e.g., a smart phone), a web terminal (e.g., a device including a web browser), a video conferencing terminal (e.g., a device including a camera), an application, a plug-in (e.g., via an API), and so on, or combinations thereof.

In one example, the conference attendees may utilize the user interfaces 14, 16 to establish and/or maintain a connection with the conference service 11 over a communication channel, such as a transmission control protocol (TCP) channel, a user datagram protocol (UDP) channel, a public switched telephone network PSTN channel, and so on, or combinations thereof. For example, the conference attendees may dial a single conference number using the user interfaces 14, 16 and enter the access code corresponding to each conference the attendees wish to join. The conference attendees may also dial separate conference numbers using the user interfaces 14, 16 and enter the access code corresponding to each conference the attendees wish to join. In the illustrated example, the conference service 11 and the user interface 14 establish and/or maintain a connection using communication data 18, which may include a TCP SYNC, a TCP ACK, an UDP ACK, a dual-tone multi-frequency (DTMF) number, and so on, or combinations thereof. It should be understood that a similar connection may be established and/or maintained between the conference controller 12 and the user interface 16.

In the illustrated example, the user interface 14 issues authentication data 19 to the conference controller 12 when the connection is established, which may correspond to a first conference the requesting attendee wishes to join. The authentication data 19 may include, for example, an access code such as a pin number, a bridge number, a password, and so on, or combinations thereof. The requesting attendee may enter the authentication data 19 by inputting an access code for the first conference at the user interface 14. The authentication data 19 may be issued in response to a prompt (not shown), described below. The conference controller 12 may identify the authentication data 19. For example, the conference controller 12 may determine that the authentication data 19 is preset authentication data (e.g., a preset value), may determine that the authentication data 19 includes a configuration (e.g., number, type, etc.) consistent with the configuration of authentication data (e.g., an access code of four numbers 1234), and so on, or combinations thereof. The conference controller 12 may identify the authentication data 19, for example, to provide access to the first conference, to identify an encountered key code temporally located before and/or after the authentication data 19, and so on, or combinations thereof.

In the illustrated example, the authentication data 19 causes the conference controller 12 to provide audio 20, which corresponds to the first conference. In one example, the requesting attendee may utilize the user interface 14 to dial a conference number (e.g., a single 800 number) to establish a connection with the conference service 11, and enter a corresponding access code (e.g., a pin number, a bridge number, etc.) for the first conference to access (e.g., listen to, participate in, etc.) the first conference. It should be understood that the conference controller 12 may provide any data, whether multiplexed or not, for the first conference, such as video data, text data, web page data, presentation data, spreadsheet data, and so on, or combinations thereof. Accordingly, the requesting attendee may be placed in the first conference and the conference controller 12 may provide at least audio of the first conference in response to the authentication data 19 corresponding to the first conference.

In the illustrated example, the user interface 14 issues a hold key code 21 to the conference controller 12. The hold key code 21 may include a key sequence of one or more keys (e.g., *1, etc.). In one example, the requesting attendee may enter the hold key code 21 by inputting the key sequence of the hold code 21 at the user interface 14. The hold key code 21 may cause the conference controller 12 to place the first conference on hold. In addition, the hold key code 21 may cause the conference controller 12 to mute the first conference. The hold key code 21 may also cause the conference controller 12 to respond with a prompt 22. A prompt, such as the prompt 22, may include a dialog having instructions to prompt for any data. For example, the prompt 22 may include a dialog having instructions to prompt for data corresponding to one or more conference operations, such as a modification operation including an add operation, a delete operation, a select operation, a rejoin operation, and so on, or combinations thereof. The instructions may include any data type, such as audio data, video data, text data, and so on, or combinations thereof.

In one example, the dialog may include instructions such as "Enter *2 to modify a conference", "Enter *3 to release a hold", and so on, or combinations thereof. In another example, such as when the key code *2 is entered to modify a conference, the dialog may include instructions directed to a type of modification operation such as "Enter *4 to add a conference", "Enter *5 to delete a conference", "Enter *6 to select a subset of conferences", "Enter *7 to rejoin conferences", and so on, or combinations thereof. It should be understood that a prompt, such as the prompt 22, is optional and that any key code may be input from the user interface 14 independently of any prompt. For example, the requesting attendee may enter the key code *1 utilizing the user interface 14 to perform a hold operation involving holding the first conference independently of the prompt 22, may enter the key code *2 and/or the key code *4 utilizing the user interface 14 to perform an add operation involving adding a conference independently of the prompt 22, and so on, or combinations thereof.

In the illustrated example, the user interface 14 issues an add operation key code 23 (e.g., *4) to the conference controller 12 to add a second conference. The conference controller 12 may respond with a prompt (not shown) for authentication data 24 corresponding to the second conference. The prompt may include a dialog having instructions such as "Enter authentication data for the conference." It should be understood that prompt for the authentication data 24 corresponding to the second conference is optional, and that the authentication data 24 may be input from the user interface 14 independently of any prompt.

In one example, the requesting attendee may enter the authentication data 24 by inputting an access code for the second conference at the user interface 14. In another example, the requesting attendee may dial a conference number (e.g., an 800 number) corresponding to the second conference and then enter the authentication data 24 corresponding to the second conference at the user interface 14. The conference controller 12 may identify the authentication data 24 and/or the conference number by, for example, determining that the data encountered when the first conference is on hold is preset authentication data (e.g., a preset value), includes a configuration (e.g., number, type, etc.) consistent with the configuration of authentication data (e.g., an access code of four numbers 5678), includes a configuration consistent with a conference number (e.g., conference number of nine number 800123456) and so on, or combinations thereof.

In the illustrated example, the user interface 14 issues a release key code 25. The release key code 25 may include a key sequence of one or more keys (e.g., *3, etc.). The requesting attendee may, for example, enter the release key code 25 by inputting the key sequence of the release key code 25 at the user interface 14. In one example, the prompt for the authentication data 19 may include a prompt (not shown) for the release key code 25. For example, the prompt may include a dialog having instructions such as "Enter authentication data for the conference followed by *3." In another example, the prompt for the release code 25 may be separate from the prompt for authentication data 19. For example, the conference controller 12 may automatically issue the prompt for the release key code 25 when the conference controller 12 identifies that the authentication data 19 has ended. It should be understood that the prompt for the release key code 25 is optional, and that the release key code 25 may be input from the user interface 14 independently of any prompt.

The release key code 25 may cause the conference controller to release the hold on first conference. The release key code 25 may also cause the conference controller 12 to provide at least multiplexed audio 26 to the requesting attendee for a plurality of conferences including the first conference and the second conference. In addition, any other data for the plurality of conferences may be provided to the requesting attendee, whether multiplexed or not, such as video data, text data, web page data, presentation data, spreadsheet data, and so on, or combinations thereof. In the illustrated example, the conference controller 12 provides at least the multiplexed audio 26 to the requesting attendee having access to each of the plurality of conferences (e.g., access to the first conference and the second conference) via the user interface 14. The multiplexed audio 26 causes the requesting attendee to simultaneously listen to the plurality of conferences via the multiplexed audio 26. For example, the requesting attendee may simultaneously listen to multiplexed audio of the first conference and the second conference over the same connection between the user interface 14 and the conference service 11, the same communication channel between the user interface 14 and the conference service 11, and so on, or combinations thereof.

The conference controller 12 may not block the multiplexed audio 26 to one or more other attendees, may provide the multiplexed audio 26 to one or more other attendees, and so on, or combinations thereof. For example, the requesting attendee may instruct the conference controller 12 to provide the multiplexed audio 26 to one or more other attendees, such as the other attendee utilizing the user interface 16.

In the illustrated example, the conference controller 12 blocks the multiplexed audio 26 for the other attendee utilizing the user interface 16. For example, the conference controller 12 may prevent the multiplexed audio 26 from departing to the user interface 16. The conference controller 12 may also prevent the multiplexed audio 26 from being accepted at the user interface 16. The conference controller 12 may prevent the user interface 16 from utilizing the multiplexed audio 26.

In the illustrated example, the conference controller 12 provides respective audio 27 to the other attendee utilizing the user interface 16, which corresponds only to a respective conference of the plurality of conferences in which the other attendee has access. For example, the other attendee may have access (e.g., is invited to join, has an access code to join, is authorized to join, etc.) to the second conference and does not have access (e.g., is not invited to join, does not have an access code to join, is unauthorized to join, etc.) to the first conference. Moreover, the other attendee may not have any desire to participate, join, listen, and/or contribute in the first conference. Accordingly, the conference controller 12 may block the multiplexed audio 26 for the other attendee, may provide the respective audio 27 which corresponds only to the respective conference in which the other attendee has access (e.g., audio corresponding only to the second conference), and so on, or combinations thereof.

The conference controller 12 may provide multiplexed audio (not shown) different than the multiplexed audio 26 to the other attendee utilizing the user interface 16. In one example, the multiplexed audio provided to the other attendee may not overlap with the multiplexed audio 26 (e.g., does not include at least one common conference). In another example, the multiplexed audio provided to the other attendee may partially overlap with the multiplexed audio 26 (e.g., does include at least one common conference). For example, the other attendee may perform an add operation utilizing the user interface 16 to add a third conference to the second conference. In response, the conference controller 12 may provide multiplexed audio to the other attendee for a plurality of conferences including the second conference and the third conference, which may cause the other attendee to simultaneously listen to the second conference and the third conference.

In a further example, the attendee utilizing the user interface 14 may have access to the second conference and not to the third conference, may not have any desire to listen to the third conference, and so on, or combinations thereof. The conference controller 12 may block, and/or may not provide, the multiplexed audio for the plurality of conference including the second conference and the third conference for the attendee utilizing the user interface 14. Indeed, the conference controller 12 may provide the multiplexed audio 26 to the attendee utilizing the user interface 14 concurrently with providing the multiplexed audio for the plurality of conferences including the second conference and the third conference to the attendee utilizing the user interface 16.

Accordingly, every conference attendee may be able to simultaneously listen to a plurality of conferences which are of interest, may be able to simultaneously listen to a plurality of conferences in which the attendee has access (e.g., is invited to join, has an access code to join, is authorized to join, etc.), and so on, or combinations thereof. In addition, there may be no need to split an original conference into subgroups, since each conference attendee may have the control to modify a conference (e.g., add a conference, delete a conferment, etc.) as desired. Moreover, there may be no need to unnecessarily force a conference attendee that is uninterested and/or unauthorized in a conference to participate, join, listen, and/or contribute in the conference when one or more other attendees wish to simultaneously listen to more than one conferences including the conference.

In the illustrated example of FIG. 1B, the conference controller 12 provides at least the multiplexed audio 26 to the requesting attendee having access to each of the plurality of conferences (e.g., access to the first conference and the second conference) via the user interface 14. The user interface 14 issues a hold key code 28, which causes the conference controller 12 to place at least the first conference and the second conference on hold. The conference controller 12 may also respond with a prompt 29. It should be understood that the prompt 29 is optional. In addition, it should be understood that the hold key code 28 and the prompt 29 may be the same and/or similar to the hold key code 21 and the prompt 22, respectively, described above. In one example, the requesting attendee may enter the hold key code *1 utilizing the user interface 14 to perform a hold operation for the plurality of conferences including the first conference and the second conference.

In the illustrated example, the user interface 14 issues a delete operation key code 30 to the conference controller 12 to delete a conference of the plurality of conferences, such as the first conference and/or the second conference. The delete key code 30 may include a key sequence of one or more keys (e.g., *5, etc.). In one example, the requesting attendee may enter the delete key code 30 by inputting the key sequence of the hold code 30 at the user interface 14. For example, the requesting attendee may enter the key code *2 and/or the key code *5 utilizing the user interface 14 to perform a delete operation involving deleting the conference. The conference controller 12 may respond with a prompt for identification data 31 (not shown) to identify the conference to be deleted. The prompt may include a dialog having instructions such as "Enter identification data for the conference." In one example, the identification data 31 may include the authentication data for the conference to be deleted, the sequence number of the conference in a conference chain to be deleted, the conference number of the conference to be deleted, and so on, or combinations thereof. It should be understood that the prompt for the identification data 31 is optional, and that the identification data 31 may be input from the user interface 14 independently of any prompt.

The conference controller 12 may identify the identification data 31 by, for example, determining that the data encountered when the plurality of conferences including the first conference and the second conference is on hold includes preset authentication data (e.g., the preset value) previously entered, includes a configuration (e.g., number, type, etc.) consistent with a configuration of authentication data (e.g., an access code of four numbers 1234, 5678, etc.) previously entered, includes a configuration consistent with a conference number (e.g., conference number of nine number 800123456) previously entered, and so on, or combinations thereof. In one example, the user interface 14 may issue the access code 5678 corresponding to the second conference, which may cause the conference controller 12 to identify the second conference as the conference to be deleted, may cause the conference controller 12 to identify the first conference as a remaining conference, and so on, or combinations thereof.

In the illustrated example, the user interface 14 issues a release key code 32. In one example, the release key code 32 may be the same and/or similar to the release key code 25, described above. The release key code 32 may be issued in response to a prompt (not shown). For example, the prompt for the identification data 31 may include a dialog having instructions such as "Enter identification data for the conference followed by *3." In another example, the prompt for the release key code 32 may be separate from the prompt for the identification data 31. For example, the conference controller 12 may automatically issue the prompt for the release key code 32 when the conference controller 12 identifies that the identification data 31 has ended. It should also be understood that the prompt for the release key code 32 is optional, and that the release key code 32 may be input from the user interface 14 independently of any prompt.

The release key code 32 may cause the conference controller to release the hold on the remaining conference (e.g., including the first conference, the first conference, etc.). The release key code 32 may also cause the conference controller 12 to provide at least audio 33 to the requesting attendee, which may include audio of the first conference. In addition, any other data for the remaining conference (e.g., the first conference) may be provided to the requesting attendee, whether multiplexed or not, such as video data, text data, web page data, presentation data, spreadsheet data, and so on, or combinations thereof. In the illustrated example, the conference controller 12 provides at least the audio 33 to the requesting attendee via the user interface 14, which may cause the requesting attendee to listen to audio of the first conference.

It should be understood that a plurality of key codes may be implemented for a plurality of conference operations. For example, the attendee utilizing the conference 16 may sequentially enter the hold key code *1 utilizing to perform a hold operation, may enter the key code *4 to perform an add operation, may enter the key code *5 to perform a delete operation, and may enter the key code *3 to perform a release operation to provide multiplexed data. Accordingly, the conference controller 12 may provide audio for a plurality of conferences that is tailored to each attendee.

In the illustrated example of FIG. 1C, the conference controller 12 provides at least the multiplexed audio 26 to the requesting attendee having access to each of the plurality of conferences (e.g., access to the first conference and the second conference) via the user interface 14. The user interface 14 issues a hold key code 34, which causes the conference controller 12 to place at least the first conference and the second conference on hold. The conference controller 12 may also respond with a prompt (not shown). It should be understood that the prompt is optional. In addition, it should be understood that the hold key code 34 and the prompt may be the same and/or similar to the hold key code 21 and the prompt 22, respectively, described above. In one example, the requesting attendee may enter the hold key code *1 utilizing the user interface 14 to perform a hold operation for the plurality of conferences including the first conference and the second conference.

In the illustrated example, the user interface 14 issues a selection operation key code 35 to the conference controller 12 to select a subset of the plurality of conferences, for example including the first conference and/or the second conference. The selection key code 35 may include a key sequence of one or more keys (e.g., *6, etc.). In one example, the requesting attendee may enter the selection key code 35 by inputting the key sequence of the selection key code 35 at the user interface 14. For example, the requesting attendee may enter the key code *2 and/or the key code *6 utilizing the user interface 14 to perform a selection operation involving selecting a subset of the plurality of conferences. The conference controller 12 may respond with a prompt for identification data 36 (not shown) to identify a conference to be included in the subset. The identification data 36 may be same and/or similar to the identification data 31, described above. In addition, the prompt may include a dialog having instructions such as "Enter identification data for the conference." In one example, the identification data 36 may include the authentication data for the conference to be included in the subset, the sequence number of the conference in a conference chain to be included in the subset, the conference number of the conference to be included in the subset, and so on, or combinations thereof. It should be understood that prompt for the identification data 36 is optional, and that the identification data 36 may be input from the user interface 14 independently of any prompt.

The conference controller 12 may identify the identification data 36 by, for example, determining that the data encountered when the plurality of conferences including the first conference and the second conference is on hold includes preset authentication data (e.g., the preset value) previously entered, includes a configuration (e.g., number, type, etc.) consistent with a configuration of authentication data (e.g., an access code of four numbers 1234, 5678, etc.) previously entered, includes a configuration consistent with a conference number (e.g., conference number of nine number 800123456) previously entered, and so on, or combinations thereof. In one example, the user interface 14 may issue the access code 1234 corresponding to the first conference, which may cause the conference controller 12 to identify the first conference as the conference to be included in the subset, may cause the conference controller 12 to identify the second conference as a conference to be excluded in the subset, and so on, or combinations thereof.

In the illustrated example, the user interface 14 issues a release key code 37. In one example, the release key code 37 may be the same and/or similar to the release key code 25, described above. The release key code 37 may be issued in response to a prompt (not shown). For example, the prompt for the identification data 36 may include a dialog having instructions such as "Enter identification data for the conference followed by *3." In another example, the prompt for the release key code 37 may be separate from the prompt for the identification data 36. For example, the conference controller 12 may automatically issue the prompt for the release key code 37 when the conference controller 12 identifies that the identification data 37 has ended. It should also be understood that the prompt for a release key code 37 is optional, and that the release key code 37 may be input from the user interface 14 independently of any prompt.

The release key code 37 may cause the conference controller 12 to release the hold on the subset of the plurality of conferences including the first conference. The release key code 37 may also cause the conference controller 12 to provide at least subset audio 33 to the requesting attendee, which may include audio only for the first conference, multiplexed audio including the first conference, and so on, or combinations thereof. In addition, any other data for the subset of the plurality of conferences (e.g., the first conference) may be provided to the requesting attendee, whether multiplexed or not, such as video data, text data, web page data, presentation data, spreadsheet data, and so on, or combinations thereof. In the illustrated example, the conference controller 12 provides at least the audio 33 to the requesting attendee via the user interface 14, which may cause the requesting attendee to listen to audio of the first conference.

In addition, the release key code 37 may cause the conference controller to mute audio for each conference excluded in the subset, such as the audio from the second conference. In the illustrated example, the release key code 37 may also cause the conference controller 12 to communicate audio originating from the requesting attendee with each conference included in the subset. For example, the conference controller 12 may communication audio originating at the user interface 14 to respective user interfaces of conference attendees participating in the respective conferences included in the subset. Accordingly, the requesting attendee may speak and cause each attendee participating in the respective conferences included in the subset to listen to the requesting attendee.

In the illustrated example, the user interface 14 issues a rejoin key code 39. The rejoin key code 39 may include a key sequence of one or more keys (e.g., *7, etc.). In one example, the requesting attendee may enter the rejoin key code 39 by inputting the key sequence of the rejoin key code 39 at the user interface 14. In addition, the rejoin key code 39 may cause the conference controller 12 to rejoin each conference excluded in the subset (e.g., the second conference) with each conference included in the subset (e.g., the first conference). The rejoin key code may also cause the conference controller 12 to unmute the audio for each conference excluded in the subset (e.g., to unmute the audio for the second conference). The conference controller 12 provides the multiplexed audio 26 including the first conference and the second conference to the user interface 14.

Accordingly, it should be understood that the use of a particular key code may be optional, based for example on a preference of a conference service manager, a preference of a conference service administrator, and so on, or combinations thereof. In one example, the conference controller 12 may perform an operation corresponding to a key code automatically and/or independently of requiring another particular key code, a particular sequence of key codes, and so on, or combinations thereof. For example, the rejoin key code 39 may be entered independently of a hold operation via a hold key code and/or independently of a release operation via a release key code. Moreover, the key code utilized to implement any conference operation (e.g., a delete key code utilized to implement a delete operation) may cause the conference controller 12 to implement the corresponding operation (e.g., delete automatically on encountering identification data), instead of and/or in addition to utilizing a particular key code such as a release key code. In one example, the conference controller 12 may provide the multiplexed audio 26 including the first conference and the second conference automatically on encountering the rejoin key code 39.

Figure 2:
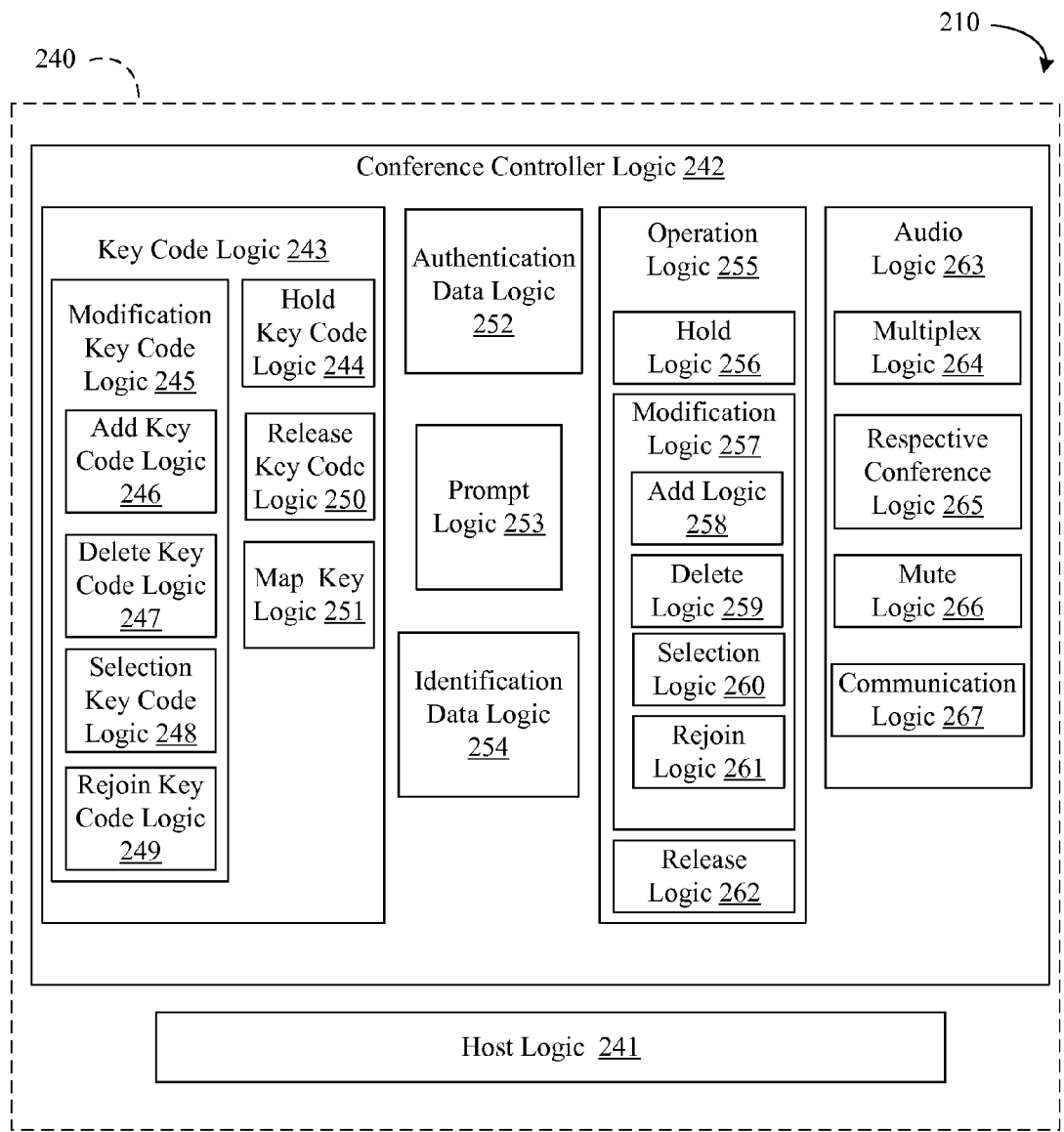
FIG. 2 is a block diagram of an example of an architecture including logic to provide at least multiplexed audio for a plurality of conferences and/or to facilitate a conference operation according to an embodiment.

FIG. 2 shows a logic architecture 210 which may provide at least multiplexed audio for a plurality of conferences and/or may facilitate a conference operation according to an embodiment. In the illustrated example, logic architecture 210 may include a conference service logic 240 to facilitate communication between two or more parties (e.g., attendees) participating in a conference. Each of the conferences may include a variety of functionality, such as audio functionality, video functionality, text functionality (e.g., Short Message Service), instant message (IM) text functionality, and so on, or combinations thereof. Accordingly, the conference service logic 440 may host a teleconference, a video conference, a web conference, a voice over internet protocol (VoIP) conference, and so on, or combinations thereof. The illustrated conference service logic 240 includes a host logic 241 to host the plurality of conferences. In one example, the host logic 241 may establish and/or maintain a connection with one or more user interfaces. For example, a conference attendee may utilize a respective user interface to establish and/or maintain a connection with the host logic 241 over a communication channel, such as a TCP channel, a UDP channel, a PSTN channel, and so on, or combinations thereof.

The illustrated conference service logic 240 includes a conference controller logic 242 to perform a conference operation (e.g., adding, deleting, selecting, etc.). In the illustrated example, the conference controller 242 includes key code logic 243 to identify one or more key codes. The illustrated key code logic 243 includes hold key code logic 244, modification key code logic 245, and release key code logic 250 to identify a hold key code, modification key code, and release key code, respectively. The illustrated modification key code logic 245 includes add key code logic 246, delete key code logic 247, selection key code logic 248, and rejoin key code logic 249 to identify add key code, a delete key code, a selection key code, and a rejoin key code, respectively. The illustrated key code logic 243 also includes map key logic 251, which may map any key code (e.g., a delete key code) with a physical hotkey of a conference device, such as a SIP telephone. The illustrated key code logic 243 may identify one or more key codes by, for example, determining that data encountered includes preset key code data (e.g., a preset value), determining that the data encountered includes a configuration (e.g., number, type, etc.) consistent with the configuration of key code data (e.g., a key sequence including a character and a number *1, *2, etc.), and so on, or combinations thereof.

The illustrated conference controller logic 242 includes authentication data logic 252 to identify authentication data. The authentication data may include an access code, such as including a pin number, a bridge number, a password, and so on, or combinations thereof. In one example, the authentication data may correspond to a conference to be added, to be deleted, to be included in a subset, to be excluded in a subset, to be rejoined, and so on, or combinations thereof. The illustrated authentication data logic 252 may identify the authentication data by, for example, determining that data encountered is preset authentication data (e.g., a preset value), determining that the data encountered includes a configuration (e.g., number, type, etc.) consistent with the configuration of authentication data (e.g., an access code of four numbers 1234, 5678, etc.), determining that the data encountered includes a configuration consistent with a conference number (e.g., conference number of nine number 800123456), and so on, or combinations thereof.

The illustrated conference controller logic 242 includes prompt logic 253 to prompt for data. The illustrated prompt logic 253 may provide a dialog which may include an instruction including any data type, such as audio data, video data, text data, and so on, or combinations thereof. In one example, the instruction may prompt for a key code, such as the hold key code, the modification key code, the release key code, and so on, or combinations thereof. The instruction may prompt for any other key code, such as the add key code, the delete key code, the selection key code, the rejoin key code, the mapping key code, a mute key code (e.g., to mute audio/video), and so on, or combinations thereof. In the illustrated example, key code logic 243 may recommend one more key codes to the prompt logic 253 to be used in the dialog. For example, the key code logic 243 may recommend the release key code to be used by the prompt logic 253 to prompt for the recommended initiation key code. The recommendation may be based on any criteria, such as available key codes, preferences, preset values, and so on, or combinations thereof.

The illustrated conference controller logic 242 includes identification data logic 254 to identify identification data. The identification data may include, for example, authentication data for a conference, a sequence number of a conference in a conference chain, a conference number of a conference, and so on, or combinations thereof. In one example, the identification data may correspond to a conference to be added, to be deleted, to be included in a subset, to be excluded in a subset, to be rejoined, and so on, or combinations thereof. The illustrated identification logic 254 may identify the identification data by, for example, determining that data encountered includes preset authentication data (e.g., the preset value) previously entered, determining that the data encountered includes a configuration (e.g., number, type, etc.) consistent with a configuration of authentication data (e.g., an access code of four numbers 1234, 5678, etc.) previously entered, determining that the data encountered includes a configuration consistent with a conference number (e.g., conference number of nine number 800123456) previously entered, determining that the data encountered includes a configuration (e.g., number, type, etc.) consistent with a sequence number corresponding to a conference in a chain of conferences (e.g., 1 for a first conference in a chain of conferences, 2 for a second conference in a chain of conferences, etc.) and so on, or combinations thereof.

The illustrated conference controller logic 252 includes operation logic 255 to facilitate a conference operation. The illustrated operation logic 255 includes hold logic 257 to implement a hold operation, modification logic 257 to implement a modification operation, and release logic 262 to implement a release operation. The illustrated modification logic 257 includes add logic 258 to implement an add operation, delete logic 259 to implement a delete operation, selection logic 260 to implement a subset selection operation, and rejoin logic 261 to implement a rejoin operation. In the illustrated example, the key code logic 243 may identify one or more key codes and notify the operation logic 255. In addition, the authentication logic 252 may identify authentication data and notify the operation logic 255. Moreover, the identification logic 255 may identify identification data and notify the operation logic 255.

In one example, the hold key code logic 244 may identify a hold key code and notify the operation logic 255, which may cause the hold logic 256 to implement a hold operation including holding one or more conferences. The add key code logic 246 may identify an add key code and notify the operation logic 255, the authentication data logic 252 may identify authentication and notify the operation logic 255, and/or the identification data logic 254 may identify identification data and notify the operation logic 255, which may cause the add logic 258 to implement an add operation including adding a conference corresponding to the authentication data and/or the identification data. The delete code logic 247 may identify a delete key code and notify the operation logic 255, the authentication data logic 252 may identify authentication and notify the operation logic 255, and/or the identification data logic 254 may identify identification data and notify the operation logic 255, which may cause the delete logic 259 to implement a delete operation including deleting a conference corresponding to the authentication data and/or the identification data.

The selection key code logic 248 may identify a selection key code and notify the operation logic 255, the authentication data logic 252 may identify authentication and notify the operation logic 255, and/or the identification data logic 254 may identify identification data and notify the operation logic 255, which may cause the selection logic 260 to implement a selection operation including selecting a subset of the plurality of conferences corresponding to the authentication data and/or the identification data. The rejoin key code logic 249 may identify a rejoin key code and notify the operation logic 255, the authentication data logic 252 may identify authentication and notify the operation logic 255, and/or the identification data logic 254 may identify identification data and notify the operation logic 255, which may cause the rejoin logic 261 to implement a rejoin operation including rejoining a conference included in the subset with a conference excluded in the subset corresponding to the authentication data and/or the identification data. The rejoin key code may also cause the rejoin logic 261 to implement a rejoin operation including rejoining each conference excluded in the subset with each conference included in the subset. The release key code logic 262 may identify a release key code and notify the operation logic 425, which may cause the release logic 262 to implement a release operation including releasing the hold on one or more conferences.

The illustrated conference controller logic 252 includes audio logic 263 to provide audio to conference parties (e.g., attendees). The illustrated audio logic 263 includes multiplex logic 264 to provide at least multiplex audio for a plurality of conferences, wherein the multiplexed audio is to be provided to a requesting attendee having access to each of the plurality of conferences to cause the requesting attendee to simultaneously listen to the plurality of conferences via the multiplexed audio. In one example, the operation logic 255 may notify the audio logic 263 that a release operation is implemented, which may cause the multiplex logic 264 to provide the multiplexed audio to the requesting attendee. The multiplex logic 264 may also provide any other data for to the requesting attendee, whether multiplexed or not, such as video data, text data, web page data, presentation data, spreadsheet data, and so on, or combinations thereof. In addition, the multiplex logic 264 may provide and/or block at least the multiplex data from one or more other conference attendees.

The illustrated audio logic 262 includes respective conference logic 265 to provide at least audio corresponding only to a respective conference of the plurality of conferences to another conference attendee having access to the respective conference. In one example, the respective conference logic 265 may provide at least the audio corresponding only to the respective conference to the other attendee concurrently as the multiplex logic 264 provides at least multiplex audio for the plurality of conferences to the requesting attendee. In another example, the multiplex logic 264 may provide multiplexed audio for a plurality of conferences including the two or more conferences in which the other attendee has access and wishes to simultaneously participate. In addition, the multiplex logic 264 may provide and/or block the multiplexed audio for the plurality of conferences including the two or more conferences (in which the other attendee has access) to one or more attendees.

The illustrated audio logic 262 includes mute logic 266 to mute one or more conferences of the plurality of conferences. In one example, the mute logic 266 may automatically mute audio originating from the requesting attendee when the multiplex logic 264 provides at least the multiplexed audio for the plurality of conferences to the requesting attendee. In another example, the operation logic 255 may notify the audio logic 263 that a selection operation is implemented and/or that a release operation is implemented, which may cause the mute logic 264 to mute audio of each conference to be excluded in the subset. The illustrated audio logic 263 also includes communication logic 267 to communicate audio originating from the requesting attendee with each conference to be included in the subset. For example, the operation logic 255 may notify the audio logic 263 that a selection operation is implemented and/or that a release operation is implemented, which may cause the communication logic 267 to communicate audio originating from the requesting attendee with each conference to be included in the subset. In a further example, the mute logic 266 may unmute the audio originating from the requesting attendee when the operation logic 255 notifies the audio logic 263 that the selection operation is implemented and/or that the release operation is implemented. The mute logic 266 may also unmute a conference excluded in a subset. For example, the operation logic 255 may notify the audio logic 263 that a rejoin operation is implemented, which may cause the mute logic 266 to unmute the audio for each conference excluded in the subset. It should be understood that the mute logic 266 and/or the communication logic 267 may mute and/or communicate, respectively, any data such as video data, presentation data, spreadsheet data, and so on, or combinations thereof.

FIG. 3 shows a method 310 to provide at least multiplexed audio for a plurality of conferences and/or to facilitate a conference operation according to an embodiment. Illustrated processing block 370 provides for providing at least audio of a first conference in response to authentication data corresponding to the first conference from a requesting attendee. In one example, the authentication data may include an access code (e.g., a pin number, a bridge number, etc.). Thus, providing the audio for the first conference at the block 370 may correspond to, for example, providing at least the audio for the first conference (e.g., FIGS. 1A, 1B, 1C, and/or FIG. 2) already discussed. Illustrated processing block 372 provides for holding the first conference and/or prompting for a conference operation. In one example, holding the first conference and/or prompting for a conference operation may be performed in response to a hold key code. The conference operation may include, for example, adding a conference, deleting a conference, selecting a subset of conferences, rejoining conferences, and so on, or combinations thereof. Thus, holding the first conference and/or prompting for the conference operation at the block 372 may correspond to, for example, holding the first conference and/or prompting for the conference operation (e.g., FIGS. 1A, 1B, 1C, and/or FIG. 2) already discussed.

Illustrated processing block 374 provides for adding at least audio of a second conference in response to authentication data corresponding to the second conference when the conference operation involves adding a conference. In one example, the adding operation may be implemented in response to an add key code. Thus, adding the audio of the second conference at the block 378 may correspond to, for example, adding the second conference (e.g., FIGS. 1A, 1B, 1C, and/or FIG. 2) already discussed. Illustrated processing block 376 provides for providing at least multiplexed audio for a plurality of conferences including the first conference and the second conference. In one example, the multiplexed audio for the plurality of conferences may be provided in response to a release key code from the requesting attendee. In another example, the multiplexed audio may be provided and/or blocked from one or more other attendees. The multiplexed audio may be provided to the requesting attendee having access to each of the plurality of conferences causing the requesting attendee to simultaneously listen to the plurality of conferences via the multiplexed audio. Thus, providing the multiplexed audio at the block 376 may correspond to, for example, providing the multiplexed audio (e.g., FIGS. 1A, 1B, 1C, and/or FIG. 2) already discussed.

Illustrated processing block 378 provides for providing at least audio corresponding only to a respective conference of the plurality of conferences to another conference attendee having access to the respective conference. Thus, providing the audio corresponding only to the respective conference at the block 378 may correspond to, for example, providing the audio corresponding only to the respective conference (e.g., FIGS. 1A, 1B, 1C, and/or FIG. 2) already discussed. Illustrated processing block 380 provides for selecting a subset of the plurality of conferences. In one example, the selection operation may be implemented in response to a selection key code and/or to identification data corresponding to each conference included in the subset. Thus, selecting the subset at the block 380 may correspond to, for example, selecting the subset (e.g., FIGS. 1A, 1B, 1C, and/or FIG. 2) already discussed. Illustrated processing block 382 provides for muting audio of each conference to be excluded in the subset and/or communicating audio originating from the requesting attendee with each conference included in the subset. Thus, muting the audio and/or communicating the audio at the block 382 may correspond to, for example, muting the audio and/or communicating the audio (e.g., FIGS. 1A, 1B, 1C, and/or FIG. 2) already discussed.

Illustrated processing block 384 provides for rejoining each conference excluded in the subset with each conference included in the subset, wherein the audio of each conference excluded in the subset is unmuted. In one example, the rejoining operation may be implemented in response to a rejoin key code. Thus, the rejoining and/or the unmuting at the block 384 may correspond to, for example, the rejoining and/or the unmuting (e.g., FIGS. 1A, 1B, 1C, and/or FIG. 2) already discussed. Illustrated processing block 386 provides for deleting audio of the second conference when the conference operation involves deleting a conference, and/or providing audio including the first conference. In one example, the deleting operation may be implemented in response to a delete key code. In another example, providing the audio including the first conference may be implemented in response to a release key code. Thus, deleting the audio of the second conference and/or providing the audio including the first conference at the block 386 may correspond to, for example, deleting the audio of the second conference and/or providing the audio including the first conference (e.g., FIGS. 1A, 1B, 1C, and/or FIG. 2) already discussed.

FIG. 4 shows a computing device 488 having a processor 490, mass storage 492 (e.g., read only memory/ROM, optical disk, flash memory), a network interface 494, and system memory 496 (e.g., random access memory/RAM). In the illustrated example, the processor 490 is configured to execute logic 498, wherein the logic 498 may implement one or more aspects of the scheme 10 (FIGS. 1A to 1C), the architecture 210 (FIG. 2), and/or the method 310 (FIG. 3), already discussed. Thus, the logic 498 may provide at least multiplexed audio for a plurality of conferences, may facilitate a conference operation such as adding a conference, deleting a conference, selecting a subset of conferences, rejoining conferences, and so on, or combinations thereof. The logic 498 may also be implemented as a software application that is distributed among many computers (e.g., local or remote). Thus, while a single computer could provide the functionality described herein, systems implementing these features can use many interconnected computers (e.g., for scalability as well as modular implementation).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:
1. A computer program product comprising:
a non-transitory computer readable storage medium; and
computer usable code stored on the non-transitory computer readable storage medium, where, if executed by a processor, the computer usable code causes a computer to:
provide audio of a first conference in response to authentication data corresponding to the first conference from a requesting attendee;
hold the first conference and prompt for a conference operation in response to a hold key code;

add audio of a second conference in response to authentication data corresponding to the second conference when the conference operation is to involve adding a conference;

provide multiplexed audio for a plurality of conferences including the first conference and the second conference in response to a release key code, wherein the multiplexed audio is to be provided to the requesting attendee having access to each of the plurality of conferences to cause the requesting attendee to simultaneously listen to the plurality of conferences via the multiplexed audio, and wherein audio corresponding only to a respective conference of the plurality of conferences is to be provided to another conference attendee having access to the respective conference.

2. The computer program product of claim 1, wherein the computer usable code, if executed, further causes a computer to:

delete audio of the second conference when the conference operation is to involve deleting a conference; and provide audio of the first conference in response to the release key code.

3. The computer program product of claim 1, wherein the computer usable code, if executed, further causes a computer to select a subset of the plurality of conferences in response to a selection key code and to identification data corresponding to each conference to be included in the subset.

4. The computer program product of claim 3, wherein the computer usable code, if executed, further causes a computer to:

mute audio of each conference to be excluded in the subset; and communicate audio originating from the requesting attendee with each conference to be included in the subset.

5. The computer program product of claim 3, wherein the computer usable code, if executed, further causes a computer to rejoin each conference excluded in the subset with each conference included in the subset in response to a rejoin key code, and wherein the audio of each conference excluded in the subset is to be unmuted.

6. A computer program product comprising:

a non-transitory computer readable storage medium; and computer usable code stored on the non-transitory computer readable storage medium, where, if executed by a processor, the computer usable code causes a computer to:

provide multiplexed audio for a plurality of conferences to a requesting attendee having access to each of the plurality of conferences to cause the requesting attendee to simultaneously listen to the plurality of conferences via the multiplexed audio, wherein audio corresponding only to a respective conference of the plurality of conferences is to be provided to another conference attendee having access to the respective conference;

provide audio of a first conference in response to authentication data corresponding to the first conference from the requesting attendee; and hold the first conference and prompt for a conference operation in response to a hold key code.

7. The computer program product of claim 6, wherein the computer usable code, if executed, further causes a computer to:

add audio of a second conference in response to authentication data corresponding to the second conference when the conference operation is to involve adding a conference; and provide multiplexed audio for the first conference and the second conference to the requesting attendee in response to a release key code.

8. The computer program product of claim 6, wherein the computer usable code, if executed, further causes a computer to:

delete audio of a second conference when the conference operation is to involve deleting a conference; and provide audio of the first conference in response to a release key code.

9. The computer program product of claim 6, wherein the computer usable code, if executed, further causes a computer to mute the first conference in response the hold key code.

10. The computer program product of claim 6, wherein the computer usable code, if executed, further causes a computer to select a subset of the plurality of conferences in response to a selection key code and to identification data corresponding to each conference to be included in the subset.

11. The computer program product of claim 10, wherein the computer usable code, if executed, further causes a computer to mute audio of each conference to be excluded in the subset.

12. The computer program product of claim 10, wherein the computer usable code, if executed, further causes a computer to communicate audio originating from the requesting attendee with each conference to be included in the subset.

13. The computer program product of claim 10, wherein the computer usable code, if executed, further causes a computer to rejoin each conference excluded in the subset with each conference included in the subset in response to a rejoin key code, and wherein the audio of each conference excluded in the subset is to be unmuted.

14. The computer program product of claim 6, wherein the computer usable code, if executed, further causes a computer to block the multiplexed audio from one or more other conference attendees.

15. A method comprising:

providing, via a conference controller, audio of a first conference in response to authentication data corresponding to the first conference from a requesting attendee;

holding, via the conference controller, the first conference and prompting for a conference operation in response to a hold key code;

adding, via the conference controller, audio of a second conference in response to authentication data corresponding to the second conference when the conference operation involves adding a conference;

providing, via the conference controller, multiplexed audio for a plurality of conferences including the first conference and the second conference in response to a release key code, wherein the multiplexed audio is provided to the requesting attendee having access to each of the plurality of conferences causing the requesting attendee to simultaneously listen to the plurality of conferences via the multiplexed audio, and wherein audio corresponding only to a respective conference of the plurality of conferences is provided to another conference attendee having access to the respective conference.

16. The method of claim 15, further including:

deleting, via the conference controller, audio of the second conference when the conference operation involves deleting a conference; and providing, via the conference controller, audio of the first conference in response to the release key code.

17. The method of claim 15, further including selecting, via a user interface, a subset of the plurality of conferences in response to a selection key code and to identification data corresponding to each conference included in the subset.

18. The method of claim 17, further including:
muting, via the conference controller, audio of each conference excluded in the subset; and
communicating, via the conference controller, audio originating from the requesting attendee with each conference included in the subset.

19. The method of claim 17, further including rejoining, via the conference controller, each conference excluded in the subset with each conference included in the subset in response to a rejoin key code, wherein the audio of each conference excluded in the subset is unmuted.

* * * * *